United States Patent [19]

Brundage

[11] 4,337,781
[45] Jul. 6, 1982

[54] ROLLER SUPPORT FOR CAGE SWEEP MECHANISM

[75] Inventor: Charles F. Brundage, Lenexa, Kans.

[73] Assignee: Allis-Chalmers Corporation, Milwaukee, Wis.

[21] Appl. No.: 135,980

[22] Filed: Mar. 31, 1980

[51] Int. Cl.³ .............................................. H01D 41/12
[52] U.S. Cl. .................................. 130/27 H; 56/14.6; 308/6 R
[58] Field of Search ........................... 130/27 T, 27 H; 56/14.6; 308/4 R, 6 R, 203, 240, DIG. 7

[56] References Cited

U.S. PATENT DOCUMENTS

| | | | |
|---|---|---|---|
| 2,663,599 | 12/1953 | Mackay et al. | 308/240 |
| 2,851,316 | 9/1958 | Thomson | 308/240 |
| 3,097,892 | 7/1963 | Newbury | 308/6 R |
| 3,410,615 | 11/1968 | Bieber | 308/6 R |
| 3,464,285 | 9/1969 | McCabe | 308/6 R |
| 4,108,150 | 8/1978 | Shaver | 130/27 H |
| 4,154,250 | 5/1979 | Stuber | 130/27 H |

Primary Examiner—Robert A. Hafer
Attorney, Agent, or Firm—Charles L. Schwab

[57] ABSTRACT

The reciprocating cage sweep mechanism (26) for an axial flow rotary combine is supported by grooved self-lubricating plastic rollers (46) running on a pair of parallel support rods (42, 43). The bottoms of the grooves (81) of the rollers (46) are spaced from the rod surface to permit a squeezing action to occur as deposits of crop material and dust build up on the surface of the rods (42, 43). The squeezing action causes the deposits to be extruded rather than compacted on the rod surface. Thus, the buildup of deposits on the rods (42, 43) are reduced. The rollers (46) are individually supported on the reciprocating cage sweep carriage (41) by nonrotatable shafts (71) each of which has a spiral recess (74) in its cylindrical bearing surface (73). The spiral groove (74) induces egress of dust and other fine particles from between the complementary cylindrical bearing surfaces (78, 73) of the roller (46) and its shaft (71).

2 Claims, 3 Drawing Figures

ROLLER SUPPORT FOR CAGE SWEEP MECHANISM

BACKGROUND OF THE INVENTION

This invention relates to axial flow rotary combines and more particularly to an improved support arrangement for a cage sweep mechanism used to prevent an accumulation of straw or the like on the upper outer surface of the foraminous cylindrical cage which surrounds the threshing rotor. The removal of the accumulation of the straw or the like from the upper exterior of the cage increases the threshing capacity of the combine. Some features of the cage sweep mechanism, shown and described in this application, are similar to those used in cage sweep mechanisms shown in U.S. Pat. Nos. 4,108,150 and 4,154,250. In the U.S. Pat. No. 4,108,150, the cage sweep mechanism is supported by parallel links, and in U.S. Pat. No. 4,154,250, the cage sweep mechanism is supported on parallel rods by guide bushings.

STATEMENT OF THE INVENTION

In the present invention, a cage sweep carriage is reciprocably mounted on a pair of parallel support rails by rollers. The rollers may be made of a self-lubricating plastic material and have annular grooves in their periphery adapted for rolling engagement with the rails. In the illustrated embodiment of the invention, cylindrical rods are used for the two parallel rails and two sets of vertically opposed rollers are mounted at axially spaced points on the cage sweep carriage for engaging upper and lower surfaces of each rod. The side surfaces of the groove of each roller engage the associated rail and the bottom of the groove is spaced from the rail so as to induce egress of material tending to accumulate on the rail. Each roller has an inward facing cylindrical bearing surface which is in bearing engagement with a complementary outward facing, cylindrical bearing surface on a support shaft on the cage sweep carriage. A helical recess in the roller support shaft bearing surface serves to induce egress of dust and the like from between the complementary cylindrical bearing surfaces of the shaft and roller. Appropriate power means are provided for reciprocating the cage sweep carriage in the direction of the threshing rotor axis and the rollers accurately support and guide the carriage in its reciprocating movement on the rails.

BRIEF DESCRIPTION OF THE DRAWINGS

One embodiment of the present invention is illustrated in the drawings in which.

DETAILED DESCRIPTION OF THE DRAWINGS

Figure 1:
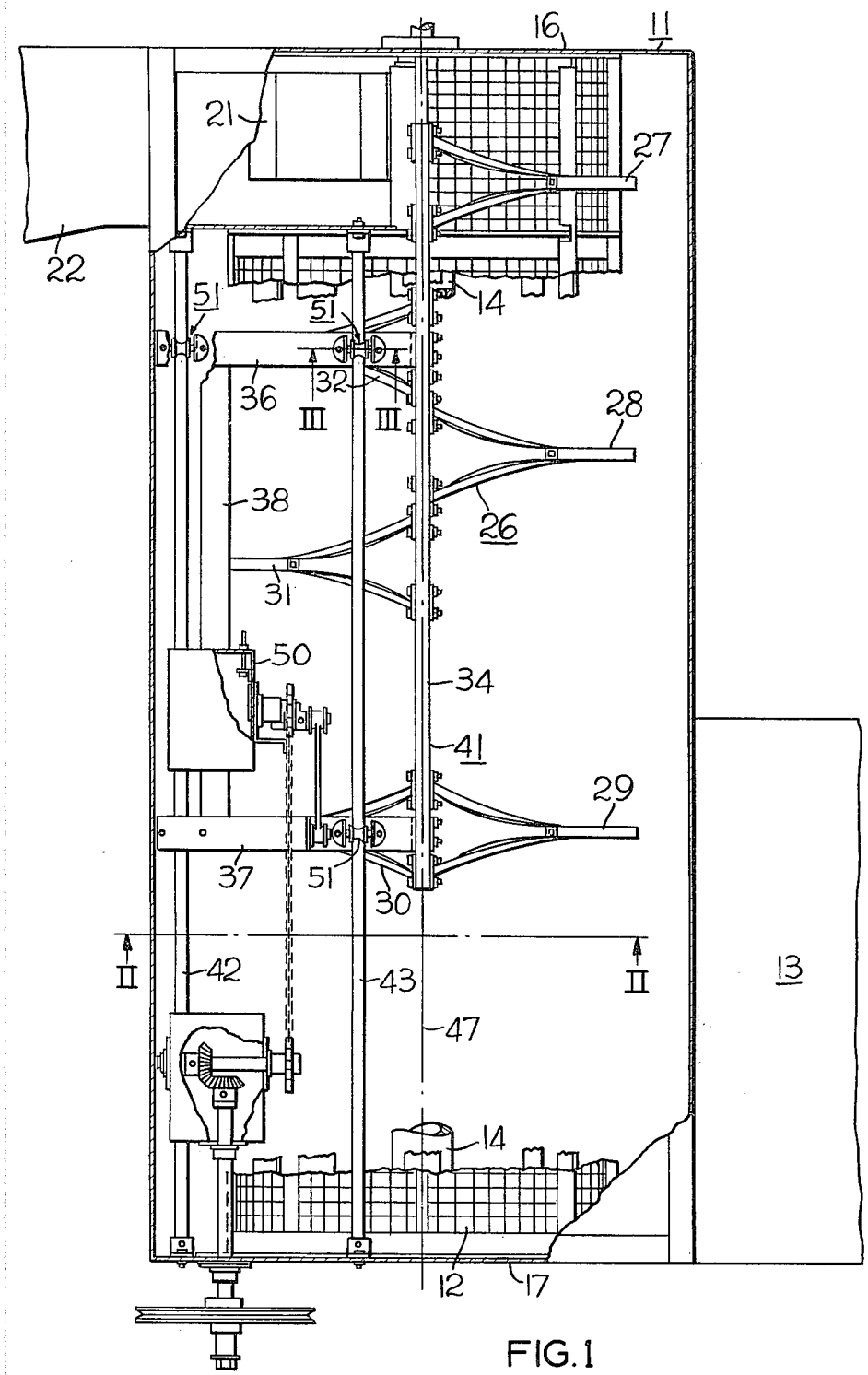
FIG. 1 is a top view of the threshing and separating portion of an axial flow rotary combine with parts broken away for illustration purposes.
Figure 2:
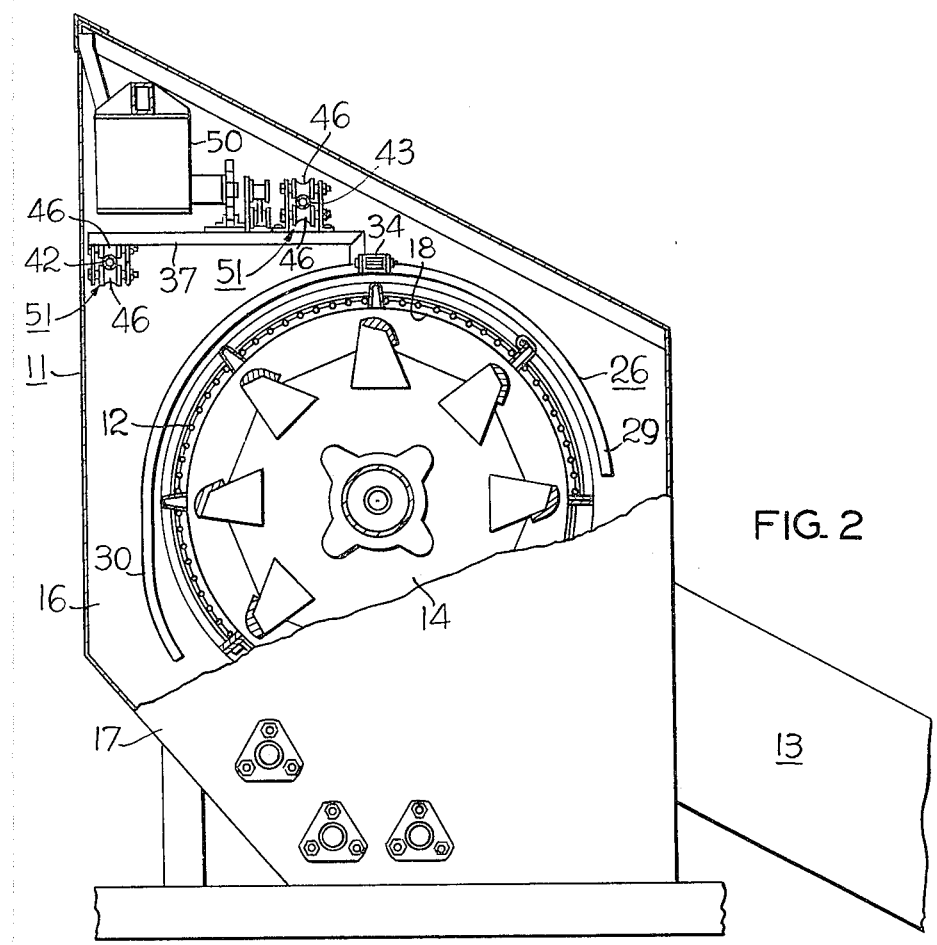
FIG. 2 is a partial section view taken along the lines II—II of FIG. 1.

It should be understood that the present invention is incorporated in an axial flow rotary combine of the type illustrated in the before-mentioned U.S. Pat. Nos. 4,108,150 and 4,154,250. FIG. 1 is a top view of the threshing and separating area of a rotary axial flow harvester or combine 11 wherein crop material is delivered to an appropriate inlet in the transverse foraminous cage 12 by way of a feeder mechanism, not shown, within feeder housing 13. Crop material entering the foraminous cage 12, is engaged by a transverse threshing rotor 14, which is rotatably supported on the sidewalls 16, 17 of the combine 11 in coaxial relation to the cage 12. Referring also to FIG. 2, spiral ribs 18 are secured to the radially inner surface of the cage and serve to induce axial flow of threshed crop material to the opposite end of the cage 12 where a paddle 21 fixed to the threshing rotor 14 causes the threshed material to be thrown rearwardly into a discharge housing 22.

A cage sweep mechanism 26 is provided to prevent a buildup of straw and the like on the upper exterior surface of the cage 12. The cage sweep mechanism 26 includes a plurality of curved scraper fingers 27, 28, 29, 30, 31, 32 adjacent the exterior of the cage 12 which are bolted to a backbone member 34. The backbone member 34 together with a pair of longitudinal struts 36, 37 and a transverse brace 38 comprise the frame of a cage sweep carriage 41. The cage sweep carriage 41 is mounted on a pair of parallel, horizontal, transversely disposed rails in the form of cylindrical rods 42, 43 extending above and in axial relation to the cage 12. The carriage 41 is reciprocated on the rods 42, 43 in the direction of the axis 47 of the cage 12 and rotor 14 by power means in the form of a drive mechanism 50 which is substantially the same mechanism as illustrated in U.S. Pat. No. 4,154,250.

Figure 3:
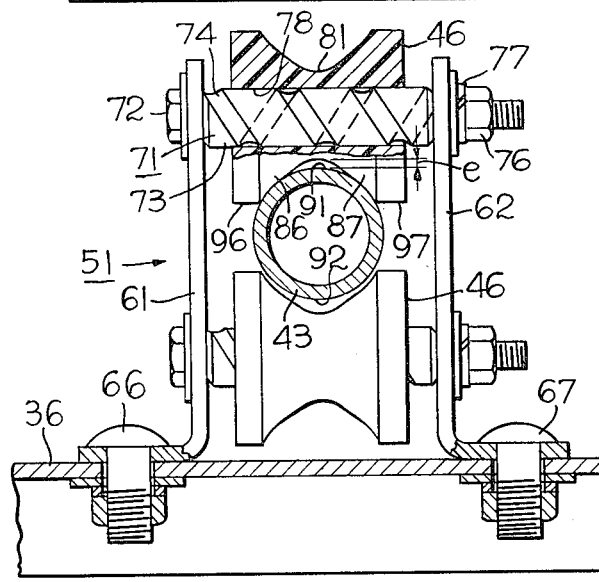
FIG. 3 is a view taken along the lines III—III of FIG. 1 showing one set of rollers of the present invention.

The support of the cage sweep carriage 41 on the parallel, horizontal, transverse support rods 42, 43 is achieved through use of four sets of roller assemblies 51 having upper and lower rollers 46 engaging upward facing and downward facing guide surfaces of the rods 42, 43. The roller assemblies 51 are identical in construction and the details of one assembly are shown in FIG. 3. The roller assembly 51, shown in FIG. 3, includes a pair of upright L-shaped support brackets 61, 62 rigidly secured to the longitudinal carriage strut 36 by bolts 66 and nuts 67. A pair of vertically spaced upper and lower rollers 46 are mounted on the support brackets 61, 62 by shafts in the form of sleeves 71 each of which has a hollow interior through which a support bolt 72 extends. The radially outward facing cylindrical bearing surface 73 of the sleeve 71 has a spiral recess 74 formed therein which extends from one axial end thereof to the other. As seen in FIG. 3, the shaft 71 and its spiral recess 74 extend axially beyond the axial extremities of the roller 46. The bolt 72 for supporting the sleeve 71 is held in place by a suitable nut 76 and lock washer 77. The roller 46 is made of a self-lubricating plastic such as nylon thereby obviating the need for providing lubricant for the cooperating radially inward facing, cylindrical bearing surface 78 of the roller 46 and the complementary bearing surface 73 of the sleeve 71. Each roller 46 has radial flanges 96, 97 disposed on laterally opposite sides of its associated rod 46 and presents an annular groove 81 whose sides engage the rod 46.

During operating, a certain amount of dust and other fine particles may accumulate between the bearing surfaces 73 and 78. The spiral recess 74 induces and facilitates axial movement and discharge of such accumulated particles. Also during operating, the space or clearance between the bottom of the annular groove 81 in the roller 46 and the shaft cylindrical bearing surface 73 permits an accumulation of crop and dust deposits on the rod to be squeezed or extruded from the rod. The radially outward diverging sides of the U-shaped section groove 81 are formed on the radial flanges 96, 97 of the top roller 46 by surfaces 86, 87 which are in confronting bearing engagement with the upward facing guide surface 91 of the rod 43 and the corresponding surfaces of the lower roller 46 are in contact with the downward facing guide surface 92 of the rod 43, thus insuring that the carriage 41 remains in assembled relation with the rod 43 on which it is reciprocably supported. As illustrated in the drawings, a pair of top rollers 46 engage the top of rod 43 and a pair of bottom rollers engage the bottom of rod 43. The pairs of rollers are spaced axially in relation to the threshing axis 47. Similarly, pairs of top and bottom rollers spaced axially in relation to axis 47 engage the top and bottom of the rod 42. The roller assemblies for the carriage herein described and claimed provide an effective operating support for the reciprocating cage sweep mechanism. The spiral groove 74 and the clearance e between the bottom of the annular roller groove and support rod surface are effective in obviate problems encountered with buildup of dust and fine particles on rolling and bearing surfaces.

The embodiments of the invention in which an exclusive property or privilege is claimed are defined as follows:

1. In an axial flow rotary harvester having a foraminous cylindrical cage, a threshing rotor within said cage supported for rotation about an axis and a cage sweep mechanism for preventing an accumulation of threshed material on the upper exterior of the cage characterized by a pair of parallel support rails above said cage extending axially relative thereto, a cage sweep carriage presenting a plurality of axially spaced scraper fingers adjacent the upper exterior surface of said cage, two pairs of roller members supporting said carriage on said rails, the roller members of each pair being spaced from one another in the direction of said axis, a radially inward facing cylindrical bearing surface on each of said roller members, shaft members on said carriage individually mounting said roller members, each shaft member having a radially outward facing cylindrical bearing surface in cooperative engagement with the cylindrical bearing surface of its associated roller member, a helical recess in the cylindrical bearing surface of each of said shaft members, said recesses extending axially beyond the cylindrical bearing surfaces of the associated roller members and inducing egress of foreign particles from between the engaging cylindrical bearing surfaces of said roller and shaft members, and power means reciprocating said carriage axially in relation to said cage.

2. The combination of claim 1 wherein said rails are cylindrical rods, each of said roller members has an annular groove of U shaped section defined by radial flanges disposed on laterally opposite sides of the associated rail and the bottom of said annular grooves are spaced from the confronting portions of the associated rails.

* * * * *